E. K. BAKER.
WHEEL FOR AUTOMOBILES OF THE LIGHTER CLASS.
APPLICATION FILED DEC. 3, 1919.
1,339,913.
Patented May 11, 1920.
2 SHEETS—SHEET 2.
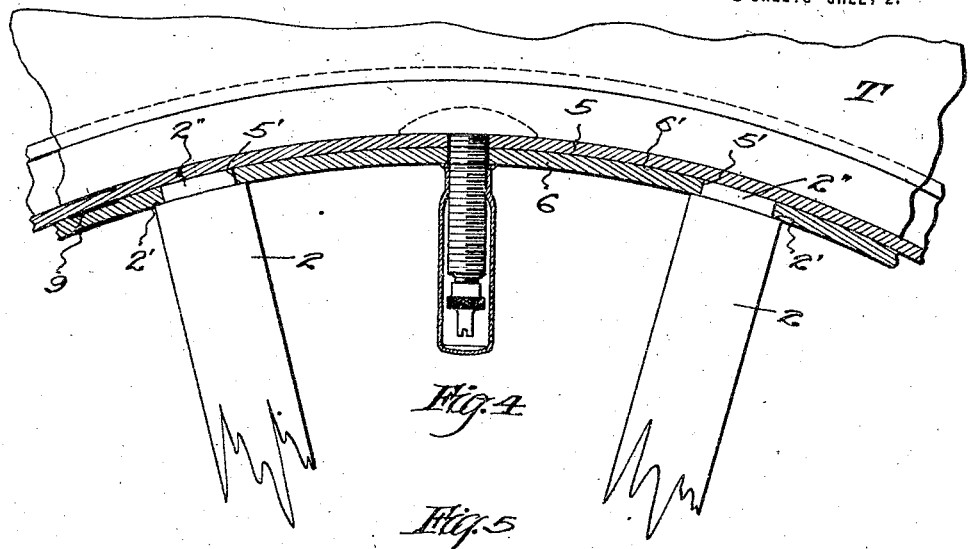
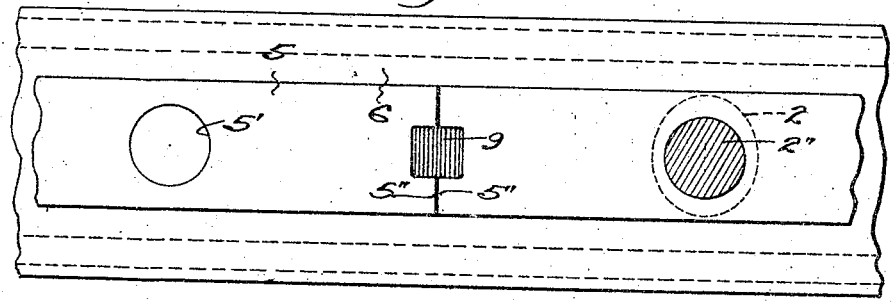
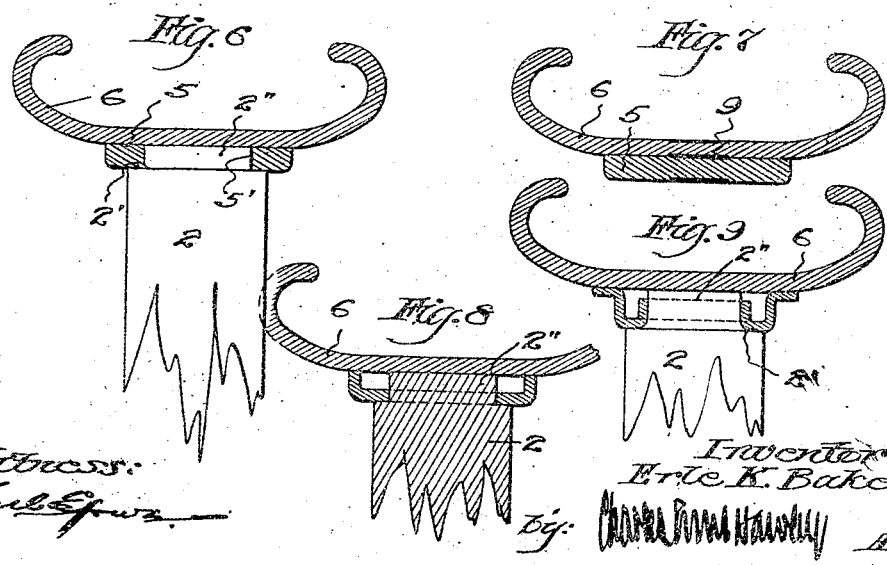

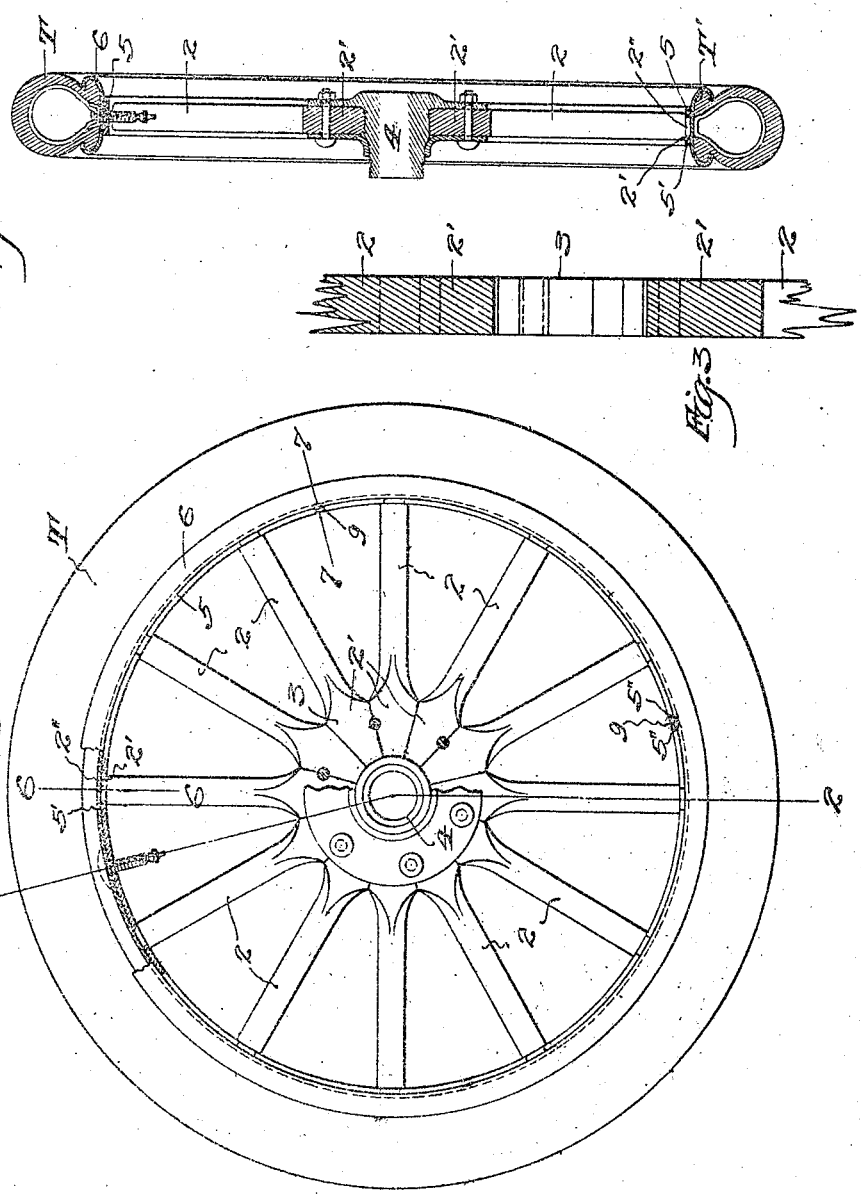

UNITED STATES PATENT OFFICE.

ERLE KING BAKER, OF CHICAGO, ILLINOIS, ASSIGNOR TO BAKER WHEEL & RIM COMPANY, OF CHICAGO, ILLINOIS, A CORPORATION OF ILLINOIS.

WHEEL FOR AUTOMOBILES OF THE LIGHTER CLASS.

1,339,913.  Specification of Letters Patent.  Patented May 11, 1920.

Application filed December 3, 1919. Serial No. 342,191.

*To all whom it may concern:*

Be it known that I, ERLE KING BAKER, a citizen of the United States, and a resident of Chicago, county of Cook, and State of Illinois, have invented certain new and useful Improvements in Wheels for Automobiles of the Lighter Class, of which the following is a specification.

My invention relates to motor vehicle wheels, especially to those of the class which I have made known as "semi-wood" wheels, and more particularly such as are characterized by fixed rims adapted to directly receive and hold pneumatic clencher tires, to be later inflated thereon; either before or after the wheel is mounted on the vehicle hub.

The object of my invention is to provide an automobile wheel of exceptional strength, lightness, resilience, durability and safety, and to employ therein a minimum number of wooden and metal parts, all of such simple construction and so easily assembled as to make it possible to manufacture the wheels at less than the cost of ordinary wood wheels adapted to the same service.

Further objects and the preferred details of my invention will appear hereinafter.

My invention will be readily understood on reference to the drawings that form part of this specification, and in which: Figure 1 is a side view of an automobile wheel embodying my invention, a portion of the wheel periphery being shown in section; Fig. 2 is a cross section substantially on the line 2—2 of Fig. 1; Fig. 3 is an enlarged section of the hub center of the wheel; Fig. 4 is a circumferential section of the portion of the wheel which contains the tire valve stem opening; Fig. 5 is an inner side view of the peripheral portion directly opposite that shown in Fig. 3; Fig. 6 is an enlarged cross-section of the peripheral portion, as on the line 6—6 of Fig. 1, but showing the spoke in full lines; Fig. 7 is an enlarged cross-section on the line 7—7 of Fig. 1; and Figs. 8 and 9 show two modifications of the fixed rim.

As shown in the drawings, my novel wheel has a full complement of radial wooden spokes, 2, each identical with all the others and having mitered butts, 2', which form the all-wood center, 3. The hub center is secured between the flanges of the vehicle hub, 4. The outer end of each spoke is provided with a shoulder, 2', and the tenon, 2''.

This wheel has a two-part fixed rim comprising an open or split ring, 5, and an endless, integrally flanged fixed rim proper, 6. The split ring as shown in Fig. 2 is little wider than the spokes and contains tenon holes, 5', which receive the respective tenons, 2'', of the spokes. The latter are of a length no less than and preferably slightly greater than the thickness of the ring, 5.

As a first operation in assembling the fixed rim upon the tenoned spokes, the perforated ring, 5, then in open condition, is wound upon the body of the spokes; taking in successive tenons, until the ring is positioned on all of them. This leaves the ends of the ring in near abutment at the point, 8.

The next assembling step consists in heating an already prepared fixed rim, 6, and then shrinking the same directly over ring, 5. In lieu thereof, and preferably I may start with an over-sized rim, 6, and then swage or upset the same directly upon the ring, 5, and the ends of the spokes, 2, best utilizing the method described and claimed in my companion application, S. N. (1862).

By both methods the fixed rim, 6, is brought to the correct circumference with respect to the tire, T, which the wheel is to bear, and incidentally the ring, 5, is contracted to such an extent as to bring its ends, 5'', into nice abutment and meantime the spoke butts composing the hub center are set inwardly to finally compact the hub center. And quite as important, the fixed rim, 6, is left in strong circumferential tension and hence in a state of strong pressure; bearing firmly upon the large ended tenons of the spokes, 2.

These steps having been accomplished, the two metal rims, 5 and 6, are fastened together, as by spaced rivets, or better still by spot welding them, in the manner clearly indicated at the points, 9, in the several figures of the drawing.

It will be obvious that in this manner the ends of the wooden spokes are permanently sealed within the spoke sockets of the ring, 5, and against the inner periphery, 6', of the rim, 6.

The strength and reliability with which the wooden spokes and the fixed rim are interlocked are both of great importance.

If desired, the split ring portion, 5, of the fixed rim may be made of lighter stock than shown in Figs. 6 or 7; and may take either of the special rolled shapes shown in Figs. 8 and 9. This statement is true only because the pressure of the heavy rim, 6, is received directly upon the ends of the spokes and the interposed ring is not required to do more than contact the rim, 6, and the shoulders, 2', of the spokes.

This wheel will be found to be of great strength in proportion to its weight, of good appearance and admirably adapted to the uses of motor vehicles and trucks of the lighter class equipped with clencher pneumatic tires of the kind which have stretchable base beads, T'. The low cost of the wheel and the ease with which it may be produced by hand or machine methods will be apparent to all who are skilled in the art.

Having this described my invention, I claim as new and desire to secure by Letters Patent.

A semi-wood wheel composed of a full complement of wooden spokes having broad tenons at their ends, in combination with a ring, 5, containing tenon sockets for said tenons of the spokes, a tire-carrying fixed rim shrunk directly upon the end tenons of said spokes and at intervals attached to said ring.

In testimony whereof, I have hereunto set my hand this 20th day of November, 1919.

ERLE KING BAKER.